T858003

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 7, 1969

858 O.G. 41

617,075

COLOR STABILIZATION OF CAPROLACTAM

Robert L. Allen, Robert F. Wenger, and David W. Williston, Beaumont, Tex., assignors to E. I. du Pont de Nemours and Company, Wilmington, Del., a corporation of Delaware

Filed Feb. 20, 1967. Published Jan. 7, 1969

Class 260—239.3

No Drawing. 7 Pages Specification

A process for the color stabilization of monomeric caprolactam by removing color-forming impurities from the caprolactam by contacting substantially anhydrous, e.g., less than 5 percent water, molten caprolactam with an oxidizing agent, preferably permanganate, e.g., an alkali metal permanganate such as potassium permanganate, and preferably at a temperature of about from 60 to 80° C., e.g., 75° C., the oxidizing agent comprising less than about 0.1 percent, e.g., 0.05 percent, by weight of the caprolactam. The process is carried out by first melting the caprolactam, preferably at about 75° C. Then the oxidizing agent, preferably an aqueous solution of about from 10 to 500 parts of water for every part of oxidizing agent, e.g., 40 parts of water for every part of oxidizing agent, is added to the molten caprolactam and mixed for about from 30 to 60 minutes, e.g., 45 minutes, at about from 60 to 80° C., e.g., 75° C. The reaction mixture should be at least about 90 percent caprolactam, e.g., 98 percent. The purified caprolactam is recovered after filtration and distillation of the reaction mixture to remove the by-products and solvent.